UNITED STATES PATENT OFFICE.

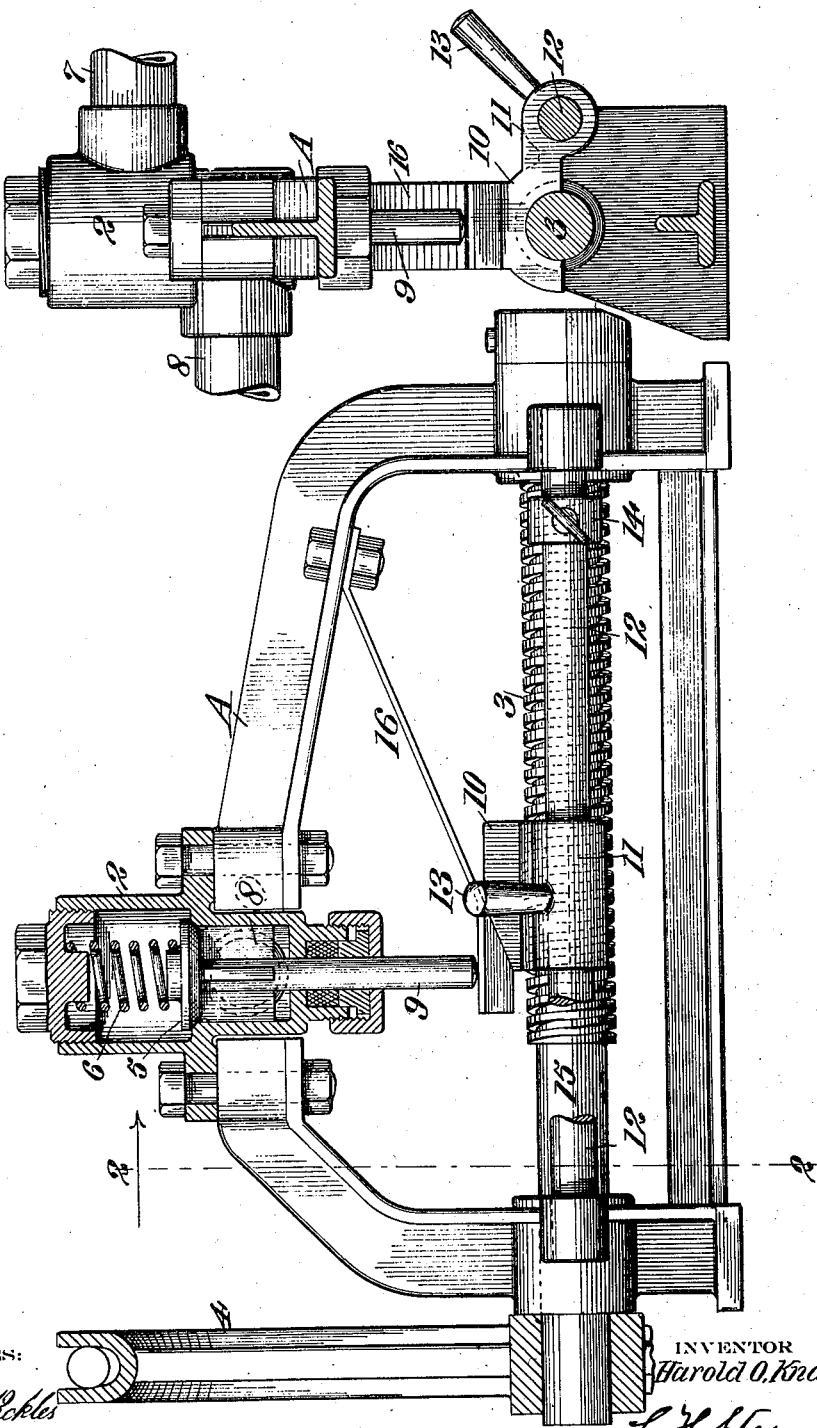

HAROLD O. KNAPP, OF CROCKETT, CALIFORNIA.

AUTOMATIC VALVE.

1,134,621.   Specification of Letters Patent.   Patented Apr. 6, 1915.

Application filed August 3, 1914. Serial No. 854,705.

*To all whom it may concern:*

Be it known that I, HAROLD O. KNAPP, a citizen of the United States, residing at Crockett, in the county of Contra Costa and State of California, have invented new and useful Improvements in Automatic Valves, of which the following is a specification.

This invention relates to a valve mechanism, and pertains especially to an automatic valve primarily designed for use in spraying water on sugar in a centrifugal machine, but manifestly applicable for other purposes.

The objects of the invention are to provide a simple, reliable device to permit of a definite interval of time between the setting of the machine and the flow of the fluid through the valve; to give a constant volume of fluid for each operation of the device; to provide easy means for varying the amount of fluid and for varying the time interval between the setting of the machine and the flow of fluid; and to enable a number of automatic valves to be driven from the same source and consequently permit of the speed of all the valves being regulated from one point.

The invention consists of the parts and the construction and combination of parts as hereinafter more fully described and claimed, having reference to the accompanying drawings, in which—

Figure 1 is a side elevation in partial section of the invention. Fig. 2 is an end view of the same taken on line 2—2, Fig. 1.

A is a suitable frame, supporting in vertical position the valve case 2 and forming suitable bearings for the worm shaft 3, which latter may be operated through the pulley 4 from any suitable source of power.

5 is a valve maintained normally in closed position by a spring 6 to cut off communication between the inlet 7 and outlet 8.

9 is a valve stem projecting into the path of the beveled nose of a traveling segmental nut 10 which rests on the worm shaft 3. The nut, or carriage, or actuator, as it may be termed, has a projection 11 slidable on a rod 12 disposed parallel with the screw 3; a handle 13 on the nut enabling it to be shifted to any desired point on the screw.

14 is an adjustable stop collar on the rod 12 limiting the backward movement of the nut.

15 is an unthreaded cylindrical surface at the end of the screw, toward which the nut is adapted to travel, which is adapted to receive the nut and allow it to come to rest after passing beneath the valve stem 9. The nut is maintained in traveling contact with the screw by appropriate means, as the spring 16.

In operation, the nut is raised from the driving screw by means of the handle 13 so as to clear the valve stem and then slid back against the valve rod 12 until it contacts with the adjustable collar 14. At this point the nut is dropped upon the driving screw. The latter being rotated at constant speed and in a direction to drive the nut forward, the latter will in due time contact with the stem 9, lift it, and maintain the valve open until the nut has passed from beneath the valve stem, again allowing the valve to close under the action of the spring 6; the carriage passing to the unthreaded portion 15 of the screw, after which the cycle may be repeated. Shifting the position of the collar 14 on rod 12 varies the distance the nut has to travel before opening the valve and consequently predetermines the time between the starting of the machine and the beginning of flow of fluid through the valve. The speed of travel of the screw determines the volume of fluid delivered, assuming a constant fluid pressure. It will be manifest that the amount of fluid passing the valve may be increased or decreased either by varying the speed of the screw and maintaining the fluid pressure constant or varying the fluid pressure without changing the speed of the screw.

While I have shown only one automatic valve, it is manifest that a number may be coupled up to the same screw and operated from one point.

Various changes in form, proportions and minor details of construction may be resorted to within the scope of the appended claims and I do not wish to limit myself to the specific design and construction here shown.

Having thus described my invention, what I claim and desire to secure by Letters Patent is—

1. In an automatic valve mechanism, the combination of a valve having a valve stem, a worm, a segmental traveling nut on the worm engageable with the valve stem to actuate the valve, a guide rod parallel with the worm on which the nut is adapted to slide, and a handle for shifting the nut along the worm.

2. In an automatic valve mechanism, the combination of a valve having a valve stem, a worm, a segmental traveling nut on the worm engageable with the valve stem to actuate the valve, said worm having an unthreaded portion at the limit of forward travel of the nut, and an adjustable guide for limiting the travel of the nut in the opposite direction.

3. In combination with a slidable valve, an actuator therefor to unseat same by wiping contact therewith, and constantly driven means to operate the actuator, said actuator being shiftable at will along the length of the operating means so as to predeterminately vary the length of time at which the valve will be unseated from the commencement of movement of the actuator.

4. In combination with a valve, an actuator therefor to unseat same, constantly driven means to operate the actuator, said actuator being shiftable at will along the length of the operating means, adjustable means adapted to be set at different positions adjacent the operating means to engage and limit the extent of movement of the actuator on the operating means, and means whereby the actuator is placed out of operative connection with the operating means subsequent to the actuator unseating the valve.

5. In combination with a valve, an actuator therefor to unseat same, constantly driven means to operate the actuator, said actuator being shiftable at will along the length of the operating means, and adjustable means adapted to be set at different positions adjacent the operating means to engage and limit the extent of movement of the actuator on the operating means.

6. In combination with a slidable valve, an actuator therefor to unseat the valve by wiping contact therewith, constantly rotated driving means for the actuator, and means whereby the actuator will be placed out of driving connection with said means subsequent to the actuator unseating the valve.

7. In combination with a valve, an actuator therefor to unseat the valve, a constantly rotated driving shaft having threads, and a nut engaged with the threads formed to unseat the valve by engagement therewith, said threads terminating at a point to one side of the valve whereby after the nut has unseated the valve same will be disengaged from the threads to thereby render the connection between the shaft and nut inoperative.

8. In combination with a valve and an actuator therefor, means to operate the actuator, guiding means arranged adjacent the operating means and engaged with the actuator to allow the actuator to be moved while on the guiding means into and out of engagement with the operating means, said actuator being shiftable at will along the length of the operating and guiding means so as to predeterminately vary the length of time at which the valve will be unseated from the commencement of the movement of the actuator.

In testimony whereof I have hereunto set my hand in the presence of two subscribing witnesses.

HAROLD O. KNAPP.

Witnesses:
  FRANS BODENHEINZ,
  H. A. RAMSAY.